Dec. 31, 1957   J. H. FULPER ET AL   2,818,008
AUXILIARY SUPPORT AND DISK FOR DISK HARROW GANGS
Filed Sept. 22, 1953   2 Sheets-Sheet 1

Inventors:
John H. Fulper
Hugh E. Cooper
and Robert L. Glidden
By: Eberhard E. Wettley
Atty.

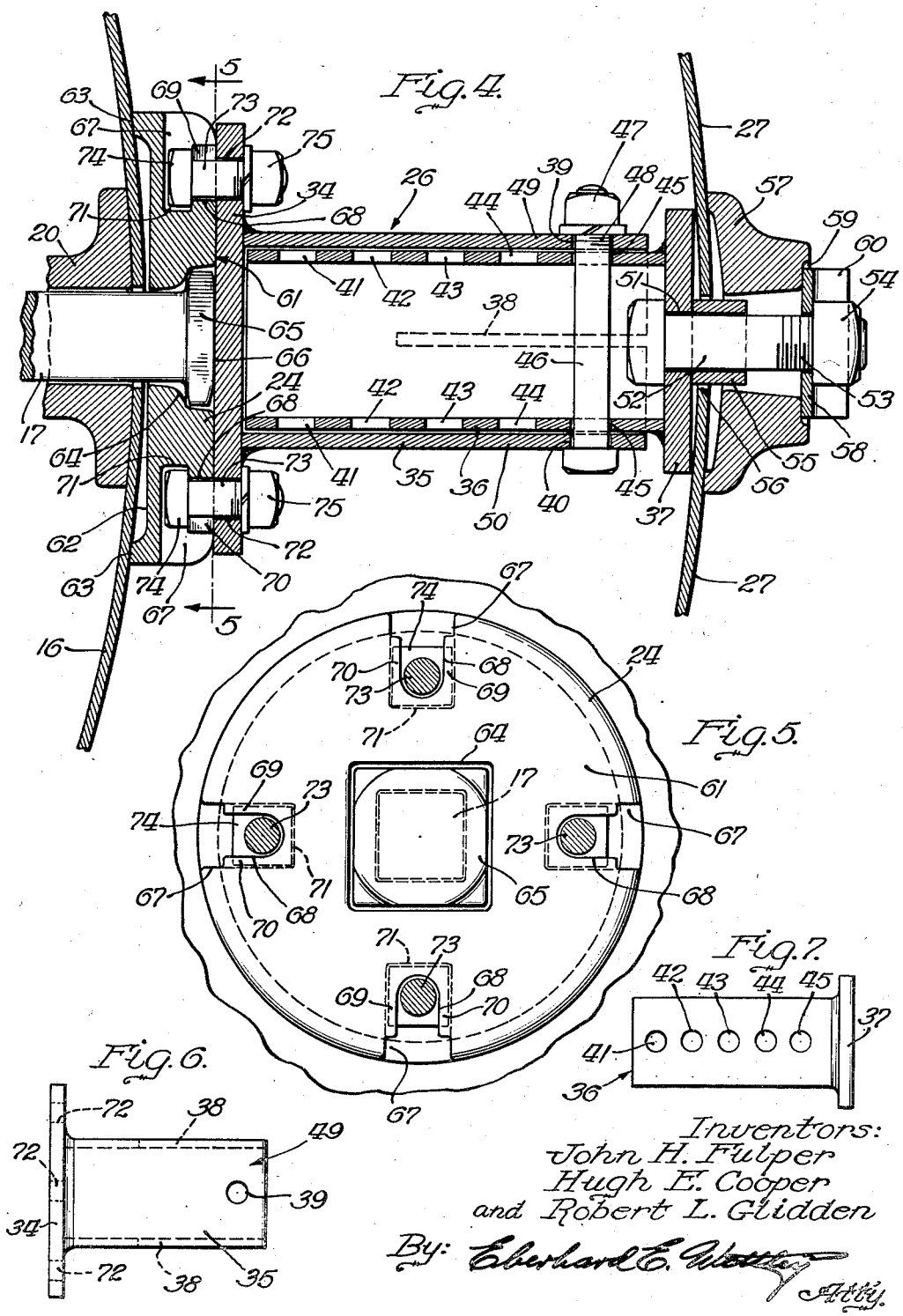

United States Patent Office 2,818,008
Patented Dec. 31, 1957

2,818,008

AUXILIARY SUPPORT AND DISK FOR DISK HARROW GANGS

John H. Fulper, Kewanee, Hugh E. Cooper, Rochelle, and Robert L. Glidden, Kewanee, Ill., assignors to Kewanee Machinery & Conveyor Company, Kewanee, Ill., a corporation of Illinois Application September 22, 1953, Serial No. 381,724

12 Claims. (Cl. 97—220)

This invention relates to a tandem disk harrow and is directed to an auxiliary support and disk adapted for use in connection with one or both of the rear disk gangs of such harrow, to fill in the undesirable trough left by the lateral outer end disk and which trough flanks the unbroken and unworked surface of the soil.

More specifically, the present invention relates to an auxiliary support that is conveniently attachable to a bumper of a disk gang of a disk harrow, which bumper is constructed and arranged to cooperate with the extension and to receive the securing means for connecting this attachment to the disk gang. It is a function of the extension of the present invention to carry auxiliary mechanism in spaced relation with the outer end of a rear gang, of disks; and more specifically, to support an auxiliary disk having a smaller diameter than the diameter of the disks of the gang, which smaller diameter disk fulfills the earth trough refilling function of the present invention.

It has been found that with the use of the conventional type of disk harrow in the field that the end disk of one of the rear disk harrow gangs forms a furrow along the edge of the unworked soil, and the end disk of the opposite gang forms a furrow along the edge of the previously worked soil, which furrows are normally comparatively deep and clean of top soil. Although the disk harrow may again traverse the field adjacent on or over this furrow, the rear outer disks still leave unfilled furrows, and these furrows may vary, with the condition of the soil. Leaving the furrows in a field produces an erosion condition causing concentrated drain water channeling and soil erosion. Not only does soil erosion occur, but also seeds or young plants may suffer through this furrow condition in a field.

It is one of the objects of the present invention to provide an auxiliary mechanism that is usable with a disk harrow to eliminate the objectionable furrows above referred to.

It is another object of the present invention to provide a bumper which provides the terminal structure of the rear gangs in lieu of the usual normal type used as a bearing element between the front gangs wherein this bumper is arranged with cooperative fastening portions to receive the extension and auxiliary means constructed and arranged to support any suitable furrow filling tool such as a disk in outboard relation with respect to the adjacent gang. In this connection, it should be understood that the ordinary assembly of gangs comprises a plurality of disks and spacing spools therebetween and that the entire assembly is locked together by means of a spindle bolt that passes through all of the disks and spools, this bolt being threaded at one end to receive the locking nut arrangement. The other end of this spindle bolt receives the bumper or bearing member, and this bumper is connected with the bolt as the first element in the assembly of the disk gang. The head of the spindle bolt normally nests within a suitably formed recess in the bumper with the convex side of the first disk in the assembly fitting in the concave side of the bumper and the subsequent disks and spools are all assembled upon the same bolt until the proper length of disk gang is assembled, at which time the securing nut is threaded upon the end of the spindle bolt.

After this disk gang is assembled, it is highly impractical to attach an additional spool to the end thereof to support any additional equipment in outboard relation to the first disk of the assembly since that would require the disassembly of the entire structure and substitution of a longer spindle bolt as is obvious from the explanation hereinbefore given.

It is, therefore, another object of this invention to provide a bumper designed to eliminate any disassembly of the disk gang of the disk harrow and to make available a means which can be used for attachable auxiliary equipment such as the furrow filling tool or disk of the present invention when the user is performing work where such an extension would be desirable. Under other conditions of operation of the disk harrow the use of a supplemental disk or tool may not be needed or desired; and with the extension apparatus herein proposed, such choice of use on nonuse of the added disk or other tool are made readily optional to the operator with little effort needed in making the change over.

It is another object of the present invention to provide a support and a tool or disk which are connected or associated with an adjacent disk gang and wherein the extension or supporting means is provided with mechanism that will adjustably position the outboard disk or other equipment in a selected given spaced relation with respect to the adjacent first disk of the disk gang assembly. This provides an adjustment that is highly efficient and practical in obtaining a proper filling of the furrow with loose soil under varying soil conditions. Normally lighter soil is thrown further than heavy soil, and with the adjustable extension means for supporting the furrow filling disk, it is possible for the operator to obtain a given quantity of earth for filling the furrow cut by the end disk in the adjacent worked or unworked surface of the soil by such adjustability.

It is a further object of the present invention to provide a telescopic tubular arrangement of mechanism which will adequately support an auxiliary disk or attachment means in a given relation beyond the normal terminal end of a disk gang.

Other objects and advantages relating to the auxiliary support and disk for disk harrow gangs shall hereinafter appear in the following detailed description having reference to the accompanying drawings forming a part of this specification.

In the drawings:

Figure 4 is an enlarged axial cross sectional view of the auxiliary support and disk for the rear gang of the disk harrow and substantially as seen along the line 4—4 in Figure 2;

Figure 5 is a transverse cross sectional view taken substantially along the line 5—5 in Figure 4 to better illustrate the construction of the bumper or bearing unit employed in connection with the present invention;

Figure 6 is a side elevational view of one of the extensible members of the supporting unit as the same appears when viewed from above or with respect to the top of this piece as indicated in Figure 4; and Figure 7 is another side elevational view of another portion of the extensible unit also as viewed from the top in relation to the position in which it is shown in Figure 4.

Figure 1:
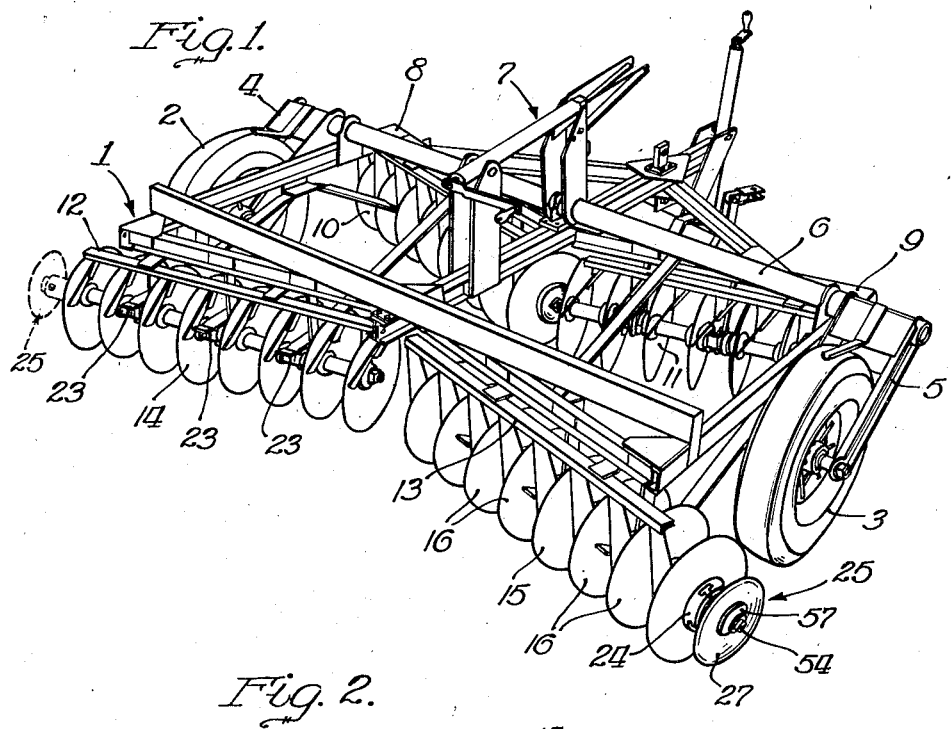
Figure 1 is a general perspective view of a disk harrow incorporating the apparatus of the present invention, which comprises an auxiliary support and disk associated with one of the disk gangs of the disk harrow.

The disk harrow generally indicated in Figure 1 comprises the usual framework 1 that is supported by wheels 2 and 3 to the swingable arms 4 and 5 connected to a rocking tube construction 6 including adjustable mechanism such as 7 for varying the angle of the wheels and arms with respect to the ground to thus dispose the frame 1 in a given relation above the ground. The frame 1 consists of auxiliary frames such as 8 and 9 to support the forward disk gangs 10 and 11, while supplemental frames 12 and 13 are carried by the frame 1 to support the rear disk gangs 14 and 15 in the usual manner.

Figure 2:
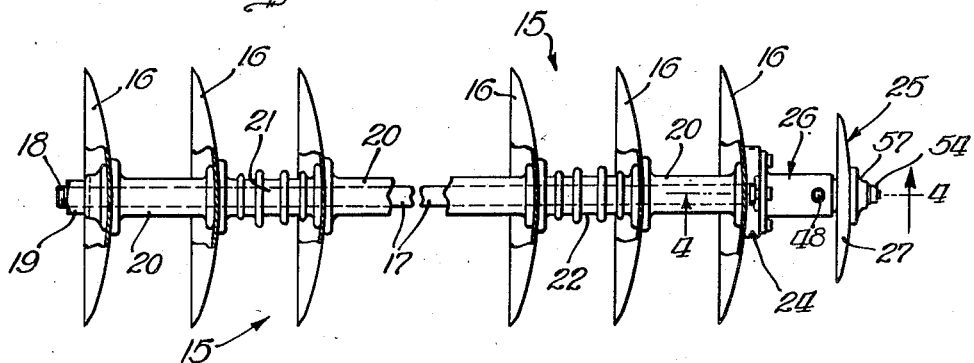
Figure 2 is an enlarged detail view of the right rear disk gang of the disk harrow shown in Figure 1, including the furrow filling mechanism as associated therewith, certain portions of this illustration being broken away and in section.

Each of the disk gang assemblies are generally constructed and assembled in the same manner. As shown in Figure 2, the rear gang assembly 15 comprises a plurality of disks 16 of equal diameter which include suitable apertures for assembly over a continuous single spindle bolt 17 which is threaded at 18 to receive a nut such as 19. A plurality of spools such as 20 are also carried upon the spindle bolt 17 to provide a given spaced relation between the adjacent disks, certain of these spools such as 21 and 22 providing the bearing units that are rotatbly carried within bearing structures such as 23 as shown to the left in Figure 1, which bearing structures connect with the associated frames such as 12. With this arrangement, the disk gang is pivotally carried from the frame to rotate as a unit for tilling the soil.

A bumper or bearing unit 24 is carried adjacent the outermost disk as shown in Figure 2, and this bumper is normally connected with the head of the spindle bolt 17, the exact construction of this bumper and bolt arrangement being hereinafter explained. The auxiliary support and disk assembly 25 is connected with the bumper 24 and in general, this unit comprises an extension unit 26 supporting an auxiliary tool or disk 27 in outboard relation with respect to the outer right hand convex side of disk 16 of Figure 2.

Figure 3:
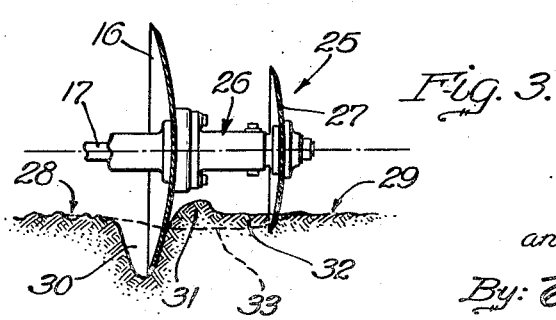
Figure 3 is a fragmentary diagrammatic view of the end portion of the disk gang shown in Figure 2 illustrating generally the relationship of the first disk and the auxiliary disk as cooperatively functioning to fill in the furrow cut by the first disk of the gang assembly.

Referring to Figure 3, which diagrammatically illustrates the action of the auxiliary equipment used in connection with the disk harrow, this view generally illustrates how the disked earth occupies a level position as at 28 while the undisked earth is shown in an unworked level at 29. The disk 16 in Figure 3 normally cuts its individual furrow as do the other disks, but this particular end disk leaves the furrow such as 30 open since there is no additional disk which will carry the soil laterally inwardly to fill up the furrow 30. Figure 3 additionally shows that a slight ridge or hump 31 is normally formed from some of the earth cast off of the last outer disk of the forward disk gang 11, and this ridge or hump flanks or parallels the furrow 30. Through the use of a disk such as 27 mounted in a given spaced relation with respect to the adjacent disk 16, it is possible to at least borrow some of the unworked dirt such as shown at 32 and to move this earth together with the surplus ridge 31 into the furrow 30 as the harrow moves over the field. Thus, instead of leaving the deep trough or furrow 30, the soil behind the disk harrow will assume a general position substantially level as indicated by the broken line 33 in Figure 3, and will thus eliminate the objectionable furrow that traverses the field over which the harrow is operating. By proper spacing of the disk 27 from the adjacent disk 16 of the disk gang, it is possible to obtain substantially the correct amount of surplus earth from the unworked portion of the field to fill the furrow 30, and this adjustment is possible through the extensible supporting unit 26 which carries the disk 27 in outboard relation beyond the end of the disk gang. Furthermore, the disk 27 is of a diameter proportionally less than the general diameter of the disk 16 of the harrow so that disk 27 efficiently moves enough dirt to normally fill the furrow 30 so that the subsequent passage of the furrow over an adjacent portion of the ground will leave the entire ground substantially smooth and level except for the normally filled surface thereof as brought about by the disk harrow.

The extension unit 26 is best illustrated in Figures 4 to 7, inclusive, and comprises generally the base 34 secured to a tube 35 constituting a coupling which is telescopically arranged with respect to a tube 36 that terminates with an abutment plate 37 constituting a tool support, these tubes being oppositely related so as to be axially separable and extensible. The outer tube 35 includes diametrically located slots, one of which is shown at 38 in Figure 3, and has a pair of aligned openings 39 and 40 formed adjacent one end thereof and substantially at right angles to the positions of the slots 38. The inner tube or sleeve 36 is provided with spaced aligned openings 41, 42, 43, 44 and 45. By moving the inner tube or sleeve 36 relatively to the outer surrounding and protecting tube 35, it is possible to align the openings 39 and 40 of the outer tube with any one of the pairs of openings 41—41 to 45—45. A locking bolt 46 is inserted through aligned openings as shown in Figure 4, and by tightening down the nut 47 on the threaded end 48 of the bolt 46, the slot separated end portions 49 and 50 of the tube 35 can be formed into tight encircling and gripping engagement with the inner tube or sleeve 36. Thus the bolt means 46 forms a locking structure to secure the two extensible sleeves or tubes 35 and 36 together by engaging through the respective openings therein, and the tightening of this locking means also provides a frictional securement between such sleeves to provide a rigid and concentric extensible support.

The abutment plate 37 is provided with an opening 51 to receive a bolt 52 which is threaded at 53 for the reception of a securing nut 54. A tightly fitting sleeve 55 is carried upon the bolt in the position illustrated, this sleeve being squared externally to pass through the squared opening 56 in the disk 27. In addition, the spacing washer 57 is confined between the locking plate 58 and the disk 27 to securely fasten the disk to the abutment plate 37. The locking plate 58 functions as a washer to back up the nut 54, and this plate is also carried in the recessed portion 59 of the spacing washer 57 shown in Figure 4. Normally the plate 58 has an extended portion such as 60 which is turned upwardly in the axial direction of the entire unit to engage one side of the nut 54 to hold the latter against loosening. Thus the entire unit comprising the washer 57, the locking plate 58 and the slot means comprises the securing structure for fastening the outboard disk 27 in a given specified relation with respect to the extensible tubular units 35 and 36.

As shown in Figures 4 and 5, the mounting member or bumper 24 comprises an annular member having an outer flat surface 61 that is tightly engaged by the base 34 with the opposite surface of the bumper recessed as at 62 to provide an annular ridge 63 for engaging the adjacent convex side of disk 16 peripherally of the spindle bolt 17. The central portion of the bumper comprises a squared recess 64 to receive the head 65 of the spindle bolt 17 in nested relation therein to produce a clamped relationship between the bumper and disk. Thus the outer face 66 of the spindle bolt is also flush wth the outer face 61 of the bumper.

The bumper is also provided with radially positioned T-slots comprising the slots 67 having narrower contiguous slots 68 aligned therewith as best shown in Figure 5. This provides flanged portions such as 69 and 70 that overlie the deeper recesses 71 of the slots 67.

As shown in Figure 4, the base 34 is provided with a plurality of openings 72 that radially surround the axis of the two telecoping tubes 35 and 36. Bolts 73 are carried within the slots 72 and the heads 74 of each of the bolts are adapted to enter the T-solts when disassembled from a radial outward position to the disposed into the relationship shown in Figures 4 and 5. Suitable nuts such as 75 secure the base 34 to the bumper 24 when the bolts 73 are assembled into the positions indicated. This assembly is normally carried out by first dropping the bolts into the slots 68 in the bumper 24 with the heads 74 entering the deeper recess 67 to the bottom 71 thereof. Then the base plate 34 can be brought up over the bolts 73 and the nuts 75 when threaded on to the bolts for securing this structure together. In this manner, any disassembly of the normally assembled disk gangs is entirely avoided and it is always possible thereafter to secure an auxiliary extension mechanism of the type described to the bumper of the disk gang to carry an outboard disk such as 27 or any other auxiliary mechanism in an outwardly spaced relation with respect to the gang per se.

Although the sleeves or tubes 35 and 36 may be secured to the base plate 34 or to the abutment plate 37 respectively in any suitable fashion, the present arrangement indicates that these tubes are welded to their respective plates.

The foregoing description has been directed to a preferred construction of auxiliary support and disk for disk harrow gangs. It is contemplated, however, that certain changes may be made in the individual parts or in the assembled combination of these parts without departing from the fundamental concept of this invention. Such changes or modifications shall, however, be governed by the breadth and scope of the language contained in the appended claims directed to this invention.

What we claim is:

1. The combination with a disk gang assembly having an outermost disk, a mounting member having a surface clamped in abutting engagement against the outermost surface of said disk, a coupling separably secured to an opposed surface of said mounting member and extending therefrom in an axial direction, a tool support separably secured to said coupling, and a tool carried by said support in axially spaced relationship to said disk.

2. The combination as set forth in claim 1 wherein said coupling and tool support are telescopically adjustable in an axial direction.

3. The combination as set forth in claim 1 wherein said coupling provides a sleeve and said tool support includes a plug received in said sleeve.

4. The combination as set forth in claim 1 wherein said coupling and tool support contain registrable radial openings and a radial key penetrating certain of said openings separably secures said coupling and tool support together.

5. In a disk harrow having a disk gang assembly comprising multiple disks, spacing spools between said disks, and a spindle bolt connecting said disks and spools, said bolt having securing means at one end to draw said disk gang assembly together; the improvement comprising a bumper connected with the other end of said spindle bolt, an auxiliary disk, an extension unit removably connected with said bumper by means of radially arranged securing means carried by said bumper to removably support said extension unit at points remotely disposed with respect to said spindle bolt axis, and attaching mechanism connected with the outer projecting end of said extension unit to removably carry said auxiliary disk in a given spaced relation with respect to said bumper.

6. In a disk harrow having oppositely related cooperative pairs of front and rear disk gang assemblies wherein the front gangs work the dirt laterally outwardly from the median path of movement of said harrow while the rear gangs work said dirt laterally inwardly toward said median path, an auxiliary harrow mechanism associated with at least one of said rear disk gangs to refill the abrupt gully formed in the ground by the outermost disk of said one gang comprising an auxiliary disk of a predetermined smaller diameter than the equal diameter disks in said one rear gang, and mounting structure carried by said one rear disk gang to support said auxiliary disk in a given outboard position with respect to the outermost adjacent disk of said one rear disk gang and coaxially with respect to the disks of said one gang comprising fastening members spaced radially outwardly with respect to the disk gang axis and connected with said outermost adjacent gang disk, and spacing means connected to support said auxiliary disk and having connection with said radially arranged fastening members.

7. In an attachment for a disk gang of a disk harrow and adapted to refill a laterally outward formed ground trough left by the outer disk of the gang and adjacent the unworked ground surface, the combination of the bumper of said disk gang, a leveling disk having a predetermined smaller diameter than the equal diameter disks of said gang, and supporting mechanism for said leveling disk comprising an adjustable extension unit, removable mounting means at one end of said unit to hold said leveling disk, a securing base at the other end of said unit and openings provided in said base, said bumper being constructed with slotted recessed portions therein, bolts to fasten said extension unit to said bumper, said bolts being positioned through said base openings with the heads of said bolts releasably carried within said slotted recessed portions of said bumper, and nuts on said bolts to fixedly attach said base to said bumper.

8. In an attachment for a disk gang of a disk harrow and adapted to refill a laterally inward formed ground trough left by the outer disk of the gang and adjacent the unworked ground surface, the combination of the bumper of said disk gang, a leveling disk having a predetermined smaller diameter than the equal diameter disks of said gang, and supporting mechanism for said leveling disk comprising an adjustable extension unit, removable mounting means at one end of said unit to hold said leveling disk, a securing base at the other end of said unit and openings provided in said base, said bumper being constructed with slotted recessed portions therein, bolts to fasten said extension unit to said bumper, said bolts being positioned through said base openings with the heads of said slots releasably carried within said slotted recessed portions of said bumper, and nuts on said bolts to fixedly attach said base to said bumper, said base and said extension unit being coaxially arranged with the base openings located in positions radially outwardly with respect to said unit, and said bumper and base occupying coaxial positions with the slotted recessed portions of the bumper arranged to receive said bolt heads radially inwardly from the peripheral exterior portion of said bumper.

9. In an attachment for a disk gang of a disk harrow and adapted to refill a laterally inward formed ground trough left by the outer disk of the gang and adjacent the unworked ground surface, the combination of the bumper of said disk gang, a leveling disk having a predetermined smaller diameter than the equal diameter disks of said gang, and supporting mechanism for said leveling disk comprising an adjustable extension unit, removable mounting means at one end of said unit to hold said leveling disk, a securing base at the other end of said unit and openings provided in said base, said bumper being constructed with slotted recessed portions therein, bolts to fasten said extension unit to said bumper, said bolts being positioned through said base openings with the heads of said bolts releasably carried within said slotted recessed portions of said bumper, and nuts on said bolts to fixedly attach said base to said bumper, said adjustable extension unit comprising relatively slidable members connected with said base and said mounting unit respectively to provide means to selectively change the spacing of said leveling disk from the next adjacent gang disk, and fastening means to secure said members together and in a selected adjusted position.

10. A securing means to carry an auxiliary extension structure for a disk gang assembly of a disk harrow having disks, spacing spools for said disks and a securing spindle bolt carrying the aforesaid parts, said securing means comprising, in combination, a complete disk gang assembly terminating with an exterior final disk securing member fixedly carried upon the terminal end of the disk gang spindle bolt, said securing member having reactionary contact with the last disk at a zone spaced radially outwardly with respect to the axis of the spindle bolt of said gang assembly, and said securing member having a plurality of attachment units spaced thereabout and radially outwardly with respect to the spindle bolt axis with said units constructed and arranged for the accommodation of coacting fastening units comprising a part of said auxiliary extension structure.

11. In a securing means of the character set forth in claim 10, but wherein said attachment units each comprise a radially formed recess in the periphery of said member to accommodate the head of a longitudinally positioned fastening bolt, and flanged portions at said recess to retain said bolt head against longitudinal displacement, said flanged portions being arranged to accommodate the stem of the fastening bolt.

12. In a securing means of the character set forth in claim 11, but wherein said securing member is formed with a smooth annular periphery connected by a smooth outer radially arranged terminal face and wherein said attachment units are all confined within the structural exterior of the aforesaid securing member.

References Cited in the file of this patent

UNITED STATES PATENTS

| | | |
|---|---|---|
| 472,656 | Howard | Apr. 12, 1892 |
| 579,622 | Whipple | Mar. 30, 1897 |
| 831,789 | King | Sept. 25, 1906 |
| 1,191,985 | Noecker | July 25, 1916 |
| 1,266,328 | Schulte | May 14, 1918 |
| 1,616,576 | Iseley | Feb. 8, 1927 |
| 2,178,052 | Smith | Oct. 31, 1939 |
| 2,199,954 | Kelsey | May 7, 1940 |